United States Patent [19]
Hikosaka et al.

[11] Patent Number: 5,825,596
[45] Date of Patent: Oct. 20, 1998

[54] HARD DISK DRIVE

[75] Inventors: Takashi Hikosaka, Tokyo; Tsutomu Tanaka, Yokohama; Kazushi Tanimoto, Tokyo, all of Japan

[73] Assignee: Kabushiki Kaisha Toshiba, Kawasaki, Japan

[21] Appl. No.: 797,127

[22] Filed: Feb. 10, 1997

[30] Foreign Application Priority Data

| Feb. 13, 1996 | [JP] | Japan | 8-025324 |
| Aug. 9, 1996 | [JP] | Japan | 8-211151 |

[51] Int. Cl.$^6$ ........................................................ G11B 5/82
[52] U.S. Cl. ................................................................ 360/135
[58] Field of Search ...................................................... 360/135

[56] References Cited

U.S. PATENT DOCUMENTS

| 4,762,742 | 8/1988 | Sonoda et al. | 428/141 |
| 5,302,434 | 4/1994 | Doerner et al. | 360/135 |
| 5,307,223 | 4/1994 | Doerner et al. | 360/135 |
| 5,353,182 | 10/1994 | Nakamura et al. | 360/135 |

FOREIGN PATENT DOCUMENTS

| 7-29164 | 1/1995 | Japan . |
| 7-121853 | 5/1995 | Japan . |

*Primary Examiner*—Robert S. Tupper
*Attorney, Agent, or Firm*—Oblon, Spivak, McClelland, Maier & Neustadt, P.C.

[57] ABSTRACT

A hard disk drive includes a magnetic disk used as a magnetic recording medium, and a magnetic head for applying magnetic fields to the disk to record data and for detecting magnetic fields from the disk to reproduce data. During recording and reproducing, the head is moved relative to the disk so as to define a track, which is a series of a number of recording bits, on the disk. At this time, the head is brought into contact with the disk, with a head contact width in the track width direction. The disk has a surface texture which presents a single peak amplitude value falling in a range of being equal to or more than 0.5 nm, and equal to or less than the recording bit length, when the surface texture is factorized into frequency compositions by means of Fourier transform. A wave length for providing the peak amplitude value falls in a range of being ten times the recording bit length or more, and equal to or less than the head contact width.

14 Claims, 8 Drawing Sheets

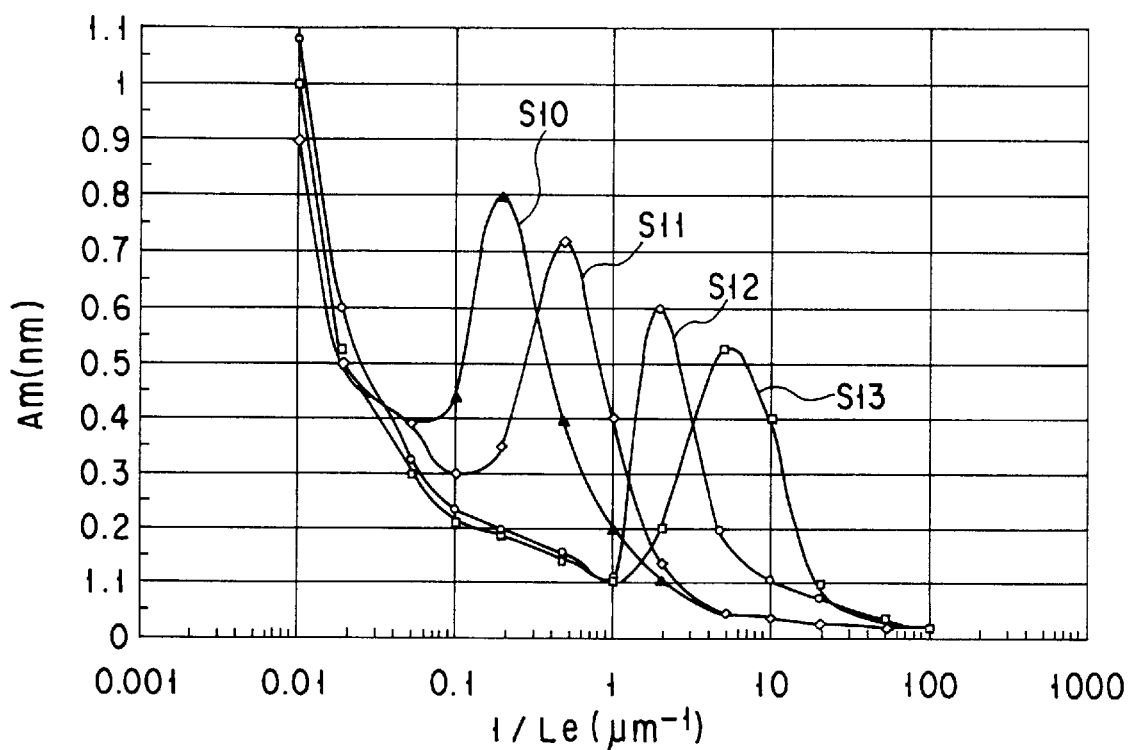
F I G. 8
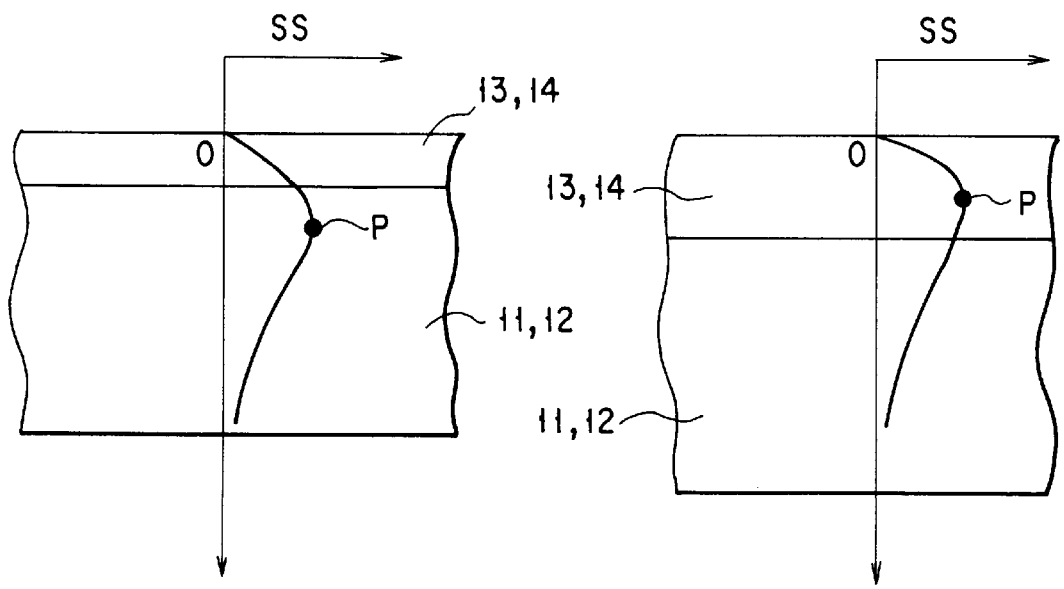
F I G. 9A     F I G. 9B

HARD DISK DRIVE

BACKGROUND OF THE INVENTION

The present invention relates to a hard disk drive in which a magnetic head is brought into contact with a magnetic disk.

In hard disk drives (HDDs), data are magnetically recorded on a recording medium, i.e., a magnetic disk, which will be referred to as a disk, and are magnetically reproduced from the disk, by a magnetic head which will be referred to as a head. The head generates recording magnetic fields on the basis of information to be written when data are recorded, while the head detects recorded magnetic fields from the disk to be transduced into reproduced signals when data are reproduced.

In relation to the HDDs, various kinds of technics have been developed so as to increase their recording density. In particular, elemental technics relating to the head and the disk are indispensable to increase the recording density. More precisely, technics of minimizing the distance between the head and disk are receiving attention, in addition to technics relating to the head itself, such as a technic employing an MR (magnetoresistive) head as a reproducing head.

A conventional HDD generally adopts the CSS (contact start and stop) type in which a head floats above the data recording surface of a disk during recording and reproducing of data. In the CSS type, as shown in FIG. 18A, a head 20 is in contact with a disk 10 when the disk stops rotating. On the other hand, when the disk starts rotating at a high speed, the magnetic head 20 floats by means of an aerodynamic force, so that recording or reproducing is performed by the head 20 floating above the data recording surface of the disk 10 as shown in FIG. 18B. At this time, the output signal level of the head 20 is increased with a decrease in a floating height FH, i.e., the distance between the head 20 and the disk 10.

In contrast to the CSS type, there has been developed a HDD in which a head and a disk are brought into contact with each other to minimize the distance between them. In this contact type, since the distance between the head and a magnetic recording region formed on the surface of the disk is zero, it is possible to relatively increase the output signal level. In other words, this contact type presents a small spacing loss, so that recording and reproducing can be performed at a considerably high density in principle. Generally, where the surface recording density of the disk is increased, the space distribution of a leaked magnetic field is decreased. As a result, the output signal level is decreased with an increase in the distance between the head and a disk.

In the contact type, however, since the head is in contact with the surface of the disk rotating at a high speed and slides thereon, the head is caused to stick to the disk where the flatness of the surface of the disk is high. It is known that this sticking phenomenon is also caused even in the CSS type when its head and disk are in contact with each other. When the sticking phenomenon is caused, a problem arises in that the head cannot smoothly slide on the disk.

In order to solve such a problem, an up-and-down wavy pattern called "texture" is formed on the surface of a disk in the CSS type, so as to give a change to the surface shape or so as to increase the surface roughness. In this case, the wavy pattern of the surface texture is formed to have a short frequency relative to the track pitch, thereby suppressing fluctuation in the levels of the head output among track portions.

Therefore, even in the contact type, it may be effective to form such a surface texture on a disk for preventing the sticking phenomenon between its head and disk. Since the wavy pattern of a surface texture reduces the contact area between the head and disk, the sticking force is decreased.

However, in a case where the recording density is as high as a track pitch of less than 3 $\mu$m, abrasion between the head and disk becomes prominent due to a surface texture having a short frequency described above. As a result, the head and disk are apt to suffer damages from fine powders generated by the abrasion.

Further, there is another problem in that a magnetic film and a protection film arranged on a disk are separated or damaged by a stress given by a head. It is thought that, in the contact type, this phenomenon is due to an extraordinarily long period of time in which the disk rotating at a high speed and the head are in contact with each other. Furthermore, medium noises due to a surface texture having a wavy patter of a short frequency are generated in the recording frequency domain of the disk, and thus can increase the error rate during data reproducing.

BRIEF SUMMARY OF THE INVENTION

In a hard disk drive having a period of time in which its head and disk are in contact with each other during recording and reproducing, the present invention has an object, to suppress the sticking phenomenon between the head and disk and realize a smooth running over a long period of time.

In a hard disk drive of such a type, the present invention has another object, to suppress abrasion of its head and disk, and generation of medium noises, due to a surface texture of the disk.

In a hard disk drive of such a type, the present invention has still another object, to suppress generation of damages, such as separation of magnetic and protection films of the disk, due to a force applied by the head.

According to a first aspect of the present invention, there is provided a hard disk drive comprising:

a magnetic disk used as a magnetic recording medium; and a magnetic head for applying a magnetic field to the disk so as to perform recording, and for detecting a magnetic field from the disk so as to perform reproducing;

wherein during the recording and reproducing, the head is moved relative to the disk so as to define a track, which is a series of a number of recording bits, on the disk, wherein the head has a period of time in which the head is brought into contact with the disk, with a head contact width in a width direction of the disk, wherein the disk has a surface texture which presents a substantially single peak amplitude value when the surface texture is factorized into frequency compositions by means of Fourier transform, and wherein a wave length for providing the peak amplitude value falls in a range of being ten times a recording bit length of each recording bit or more, and equal to or less than the head contact width.

According to a second aspect of the present invention, there is provided a hard disk drive comprising:

a magnetic disk used as a magnetic recording medium; and a magnetic head for applying a magnetic field to the disk so as to perform recording, and for detecting a magnetic field from the disk so as to perform reproducing;

wherein during the recording and reproducing, the head is moved relative to the disk so as to define a track, which is a series of a number of recording bits, on the disk, wherein the head has a period of time in which the head is brought into contact with the disk, with a head contact width in a width direction of the disk, wherein the disk has a surface texture which presents a peak amplitude value falling in a range of being equal to or more than 0.5 nm, and equal to or less than a recording bit length of each recording bit, when the surface texture is factorized into frequency compositions by means of Fourier transform, and wherein a wave length for providing the peak amplitude value falls in a range of being ten times the recording bit length or more, and equal to or less than the head contact width.

According to a third aspect of the present invention, there is provided a hard disk drive comprising:

a magnetic disk having a supporting plate and a magnetic film arranged on the supporting plate, and used as a magnetic recording medium; and a magnetic head for applying a magnetic field to the disk so as to perform recording, and for detecting a magnetic field from the disk so as to perform reproducing;

wherein during the recording and reproducing, the head is moved relative to the disk so as to define a track, which is a series of a number of recording bits, on the disk, wherein the head has a period of time in which the head is brought into contact with the disk, with a head contact width in a width direction of the disk, wherein a peak of shearing stress caused by a load given to the disk by the head in contact with the disk is positioned in the supporting plate.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE SEVERAL VIEWS OF THE DRAWING

The accompanying drawings, which are incorporated in and constitute a part of the specification, illustrate presently preferred embodiments of the invention and, together with the general description given above and the detailed description of the preferred embodiments given below, serve to explain the principles of the invention.

FIG. 8 is a graph showing still other relationships between the wave length and amplitude of a wavy pattern constituting a surface texture on a disk, obtained in the experiment 1;

FIGS. 9A and 9B are diagrams each showing a relationship between a sectional face and a shearing stress;

DETAILED DESCRIPTION OF THE INVENTION

Figure 1:
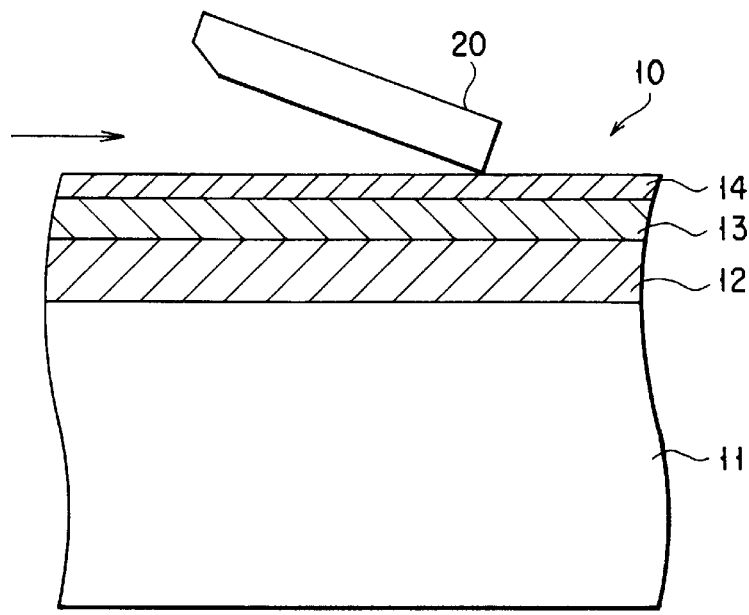
FIG. 1 is a sectional view schematically showing the main part of a hard disk drive according to an embodiment of the present invention.

As shown in FIG. 1, a hard disk drive (HDD) according to an embodiment of the present invention includes a magnetic disk 10 used as a magnetic recording medium, and a magnetic head 20 for applying magnetic fields to the disk 10 to record data and for detecting magnetic fields from the disk 10 to reproduce data. In the structure shown in FIG. 1, the disk 10 has a substrate 11, and an underlayer film 12, a magnetic film 13, and a protection film 14 which are stacked on the substrate 11 in this order. During recording and reproducing, the head is brought with a predetermined load, i.e., head load, into contact with the disk 10 which is being rotated in an angular direction, i.e., track direction as indicated by an arrow in FIG. 1.

In other words, during recording and reproducing, the head 20 is moved relative to the disk 10 so as to define a track, which is a series of a number of recording bits, on the disk 10. At this time, the head 20 has a period of time in which the head 20 is brought into contact with the disk 10, with a head contact width in a track width direction, i.e., a radial direction of the circular disk across the track.

[Surface Texture of the Disk]

Figure 2A:
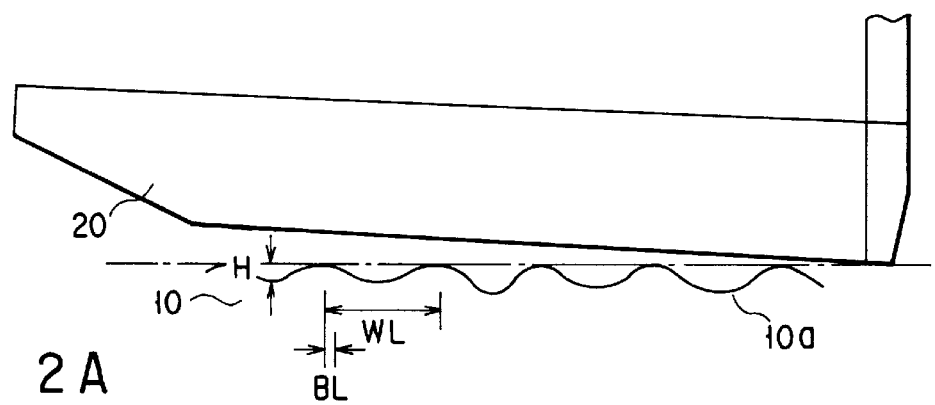
FIGS. 2A and 2B are enlarged sectional and front views, respectively, schematically showing the disk and head of the hard disk drive.
Figure 2B:
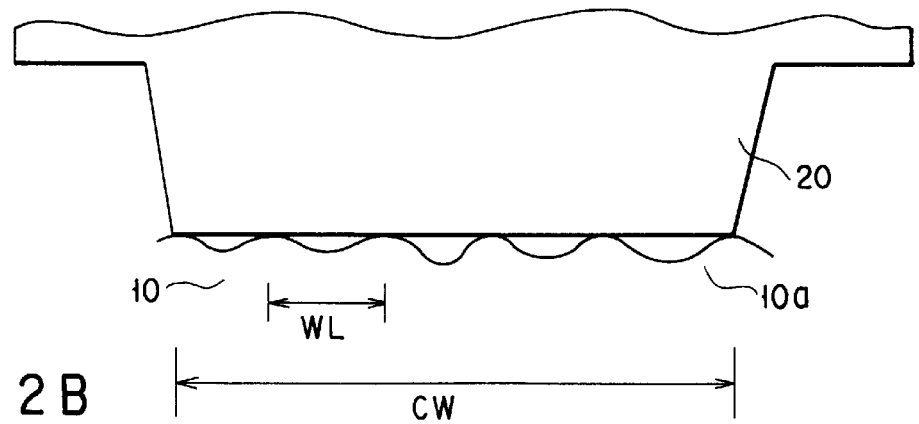

As shown in FIGS. 2A and 2B, a surface 10a of the magnetic recording medium or magnetic disk 10 has an up-and-down wavy pattern, i.e., texture. More precisely, where the up-and-down wavy pattern of the texture is factorized into frequency compositions by means of, e.g., Fourier transform, peaks of an amplitude value, preferably a single peak of an amplitude value, is obtained in accordance with conditions described below. Namely, where an amplitude value corresponding to the peaks or peak is called a peak amplitude value H:

(a) The peak amplitude value H falls in a range of being equal to or more than 0.5 nm, and equal to or less than a recording bit length BL, preferably equal to or less than 5 nm, and more preferably equal to or less than 1 nm.

(b) A wave length WL for providing the peak amplitude value H falls in a range of being ten times the recording bit length BL or more, and equal to or less than a head contact width CW.

(c) The head contact width DW is sufficiently larger than the wave length WL for providing the peak amplitude value H, and preferably two times larger than the wave length WL or more.

In the above described conditions, the recording bit length BL means the length of a recording region of one bit along the track direction, and corresponds to a half of the shortest recording wave length inherent to respective HDDs. The wave length WL for providing the peak amplitude value H corresponds to the wave length of the wavy patter forming a surface texture, i.e., a texture wave length. The head contact width CW means a width with which the head 20 and the surface 10a of the disk 10 are brought into contact with each other along the track width direction, i.e., a radial direction of the circular disk across the track.

When the disk and head are in contact, a sticking force is generated due to an inter-molecular force. It has been confirmed by experiments that the sticking force is abruptly decreased where the head and disk are separated by a small distance equal to or more than 0.5 nm which corresponds to a molecular radius. Accordingly, the surface shape of the disk is constituted such that the peak amplitude value H is equal to or more than 0.5 nm, thereby partially maintaining the distance between the disk and head, and decreasing the sticking force due to an inter-molecular force. However, where the peak amplitude value is too large, the spacing between the disk and head varies to cause fluctuation in the output signal level of the head. For this reason, an upper limit of the peak amplitude value is determined to allow the fluctuation to fall in an acceptable range.

Further, where the wave length WL for providing the peak amplitude value H falls in a range of being ten times the recording bit length BL (recording density) or more, noises generated from the surface shape of the disk belong to a low frequency domain, and can be separated from the recording frequency domain. As a result, it is possible to decrease influence of so called medium noises given to the error rate. Furthermore, since the wave length WL of the surface texture is set large, abrasion between the head and disk is suppressed even if the contact running is performed for a long period of time.

Conventionally, the wave length WL of a surface texture is set smaller than a track pitch in order to suppress output fluctuation of a head among track portions. In contrast, since the wave length WL is set larger in the present invention, output fluctuation of the head may occur among track portions. However, where the peak amplitude value H is set to fall in a range of being equal to or less than a recording bit length BL, preferably equal to or less than 5 nm, and more preferably equal to or less than 1 nm, and the amplitude values of the other frequency components are set smaller than the peak amplitude value, the output fluctuation can be suppressed so as not to practically cause problems.

Structures of the disk 10 having such a surface texture are shown in FIGS. 3A to 3F, for example. Note that the disk 10 can have structures other than those shown in FIGS. 3A to 3F so as to have the above described surface texture.

Figure 3A:
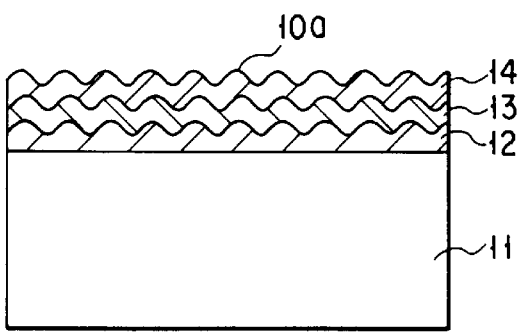
FIGS. 3A to 3F are enlarged sectional views showing disks having different structures, respectively.

A disk shown in FIG. 3A corresponds to the disk 10 shown in FIG. 1, and has an underlayer film 12, a magnetic film 13, and a protection film 14 which are stacked on a substrate 11 in this order. The wavy pattern of a texture formed on the surface 10a of the disk copies the wavy pattern of the surface of the underlayer film 12.

Figure 3B:
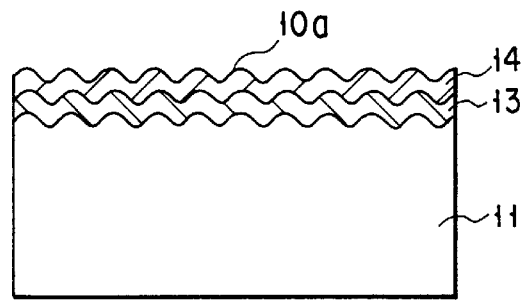

A disk shown in FIG. 3B has a magnetic film 13, and a protection film 14 which are stacked on the substrate 11 in this order, with no underlayer film 12. The wavy pattern of a texture formed on the disk surface 10a copies the wavy pattern of the surface of the substrate 11.

Figure 3C:
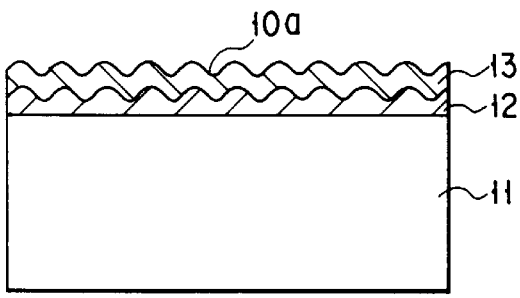

A disk shown in FIG. 3C has a structure in which the protection film 14 is eliminated from the disk shown in FIG. 3A. The wavy pattern of a texture formed on the disk surface 10a copies the wavy pattern of the surface of an underlayer film 12.

Figure 3D:
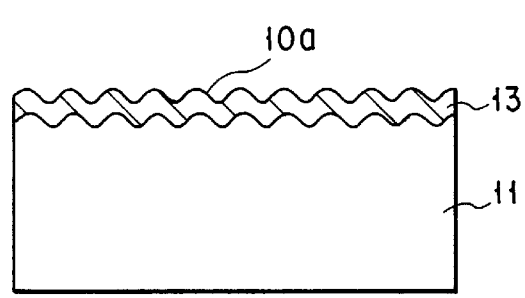

A disk shown in FIG. 3D has a structure in which the protection film 14 is eliminated from the disk shown in FIG. 3B. The wavy pattern of a texture formed on the disk surface 10a copies the wavy pattern of the surface of a substrate 11.

Figure 3E:
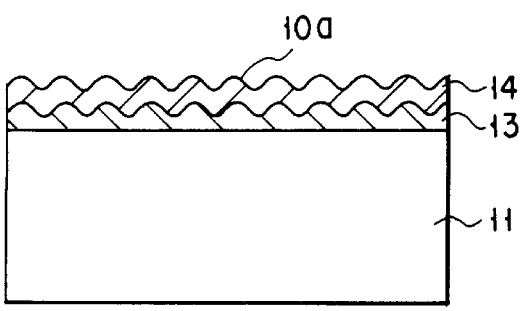

A disk shown in FIG. 3E has a structure in which the underlayer film 12 is eliminated from the disk shown in FIG. 3A. The wavy pattern of a texture formed on the disk surface 10a copies the wavy pattern of the surface of an magnetic film 13.

Figure 3F:
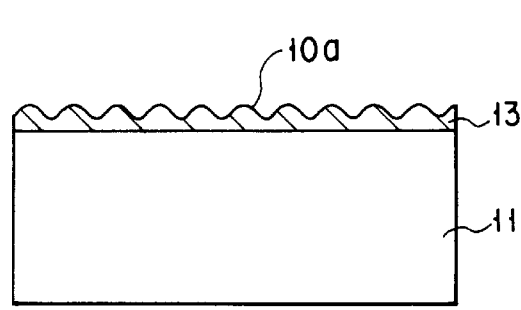

A disk shown in FIG. 3F has a structure in which the protection film 14 is eliminated from the disk shown in FIG. 3E. The wavy pattern of a texture formed on the disk surface 10a copies the wavy pattern of the surface of a magnetic film 13.

[Method of Manufacturing the Disk]

FIGS. 4A to 4D are sectional views showing steps of a method of manufacturing the disk shown in FIG. 3B in the order.

Figure 4A:
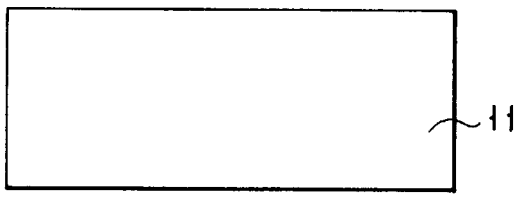
FIGS. 4A to 4D are sectional views showing steps of a method of manufacturing a disk in the order.
Figure 4B:
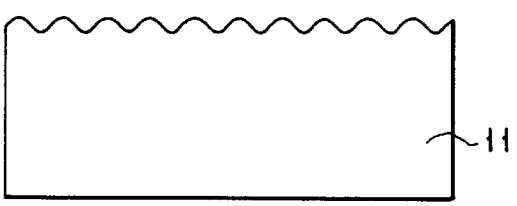

First, as shown in FIG. 4A, a silicon (Si) substrate 11 is prepared as the substrate of the disk 10, and its entire surface is polished by a polishing apparatus so as to obtain a sufficient smoothness. Then, as shown in FIG. 4B, the surface of the substrate 11 is abraded by the same polishing apparatus with abrasive grains having a predetermined uniform diameter for a different period of abrasion time, so as to form a surface shape having an up-and-down wavy patter, which is the origin of the surface texture described above, over the entire surface of the substrate 11.

Figure 4C:
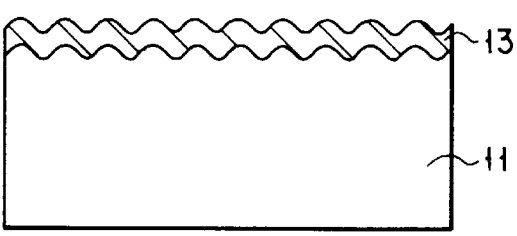
Figure 4D:
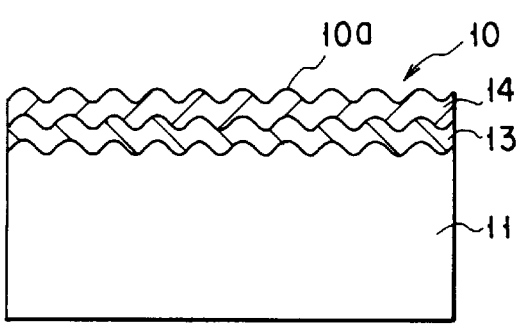

Then, as shown in FIG. 4C, a magnetic film 13 is formed on the substrate 11 by sputtering after the surface of the substrate 11 is cleaned. The magnetic film 13 consists essentially of, e.g., a cobalt (Co) alloy magnetic body. Further, as shown in FIG. 4D, a protection film 14 of, e.g., carbon (C), is formed on the surface of the magnetic film 13, so as to have a thickness of, e.g., 5 nm or less.

According to this manufacturing method, a surface 10a of the disk 10 which is brought into contact with a head 20 is the surface of the protection film 14. The texture of the surface 10a is formed by copying the surface shape of the substrate 11 which is formed in the step shown in FIG. 4B. The surface shape of the substrate 11 is formed by utilizing one of the conventional polishing or abrasion methods.

FIGS. 5A to 5D are sectional views showing steps of a method of manufacturing the disk shown in FIG. 3A in the order.

Figure 5A:
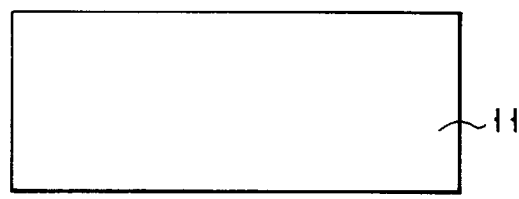
FIGS. 5A to 5D are sectional views showing steps of a method of manufacturing another disk in the order.
Figure 5B:
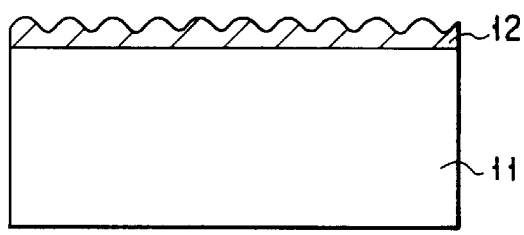

First, as shown in FIG. 5A, a silicon (Si) substrate 11 is prepared as the substrate of the disk 10, and its entire surface is polished by a polishing apparatus so as to obtain a sufficient smoothness. Then, as shown in FIG. 5B, an underlayer film 12 of vanadium (V) or vanadium alloy is formed on the substrate 11 by sputtering after the surface of the substrate 11 is cleaned. At this time, a surface shape having an up-and-down wavy patter, which is the origin of the surface texture described above, is formed over the entire surface of the underlayer film 12 by simply depositing the vanadium or vanadium alloy film by means of sputtering.

Figure 5C:
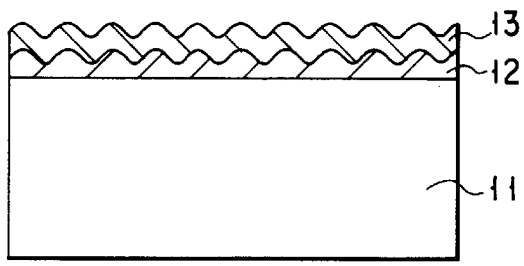
Figure 5D:
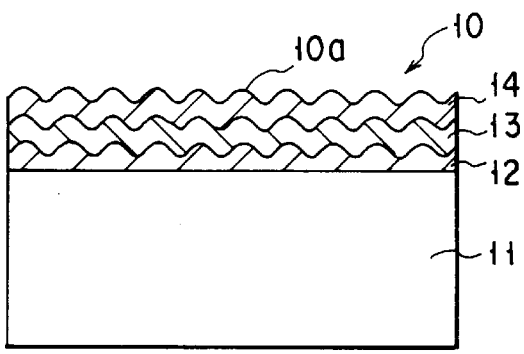

Then, as shown in FIG. 5C, a magnetic film 13 is formed on the underlayer film 12. The magnetic film 13 consists essentially of, e.g., a cobalt (Co) alloy magnetic body. Further, as shown in FIG. 5D, a protection film 14 of, e.g., carbon (C), is formed on the surface of the magnetic film 13, so as to have a thickness of, e.g., 5 nm or less.

According to this manufacturing method, a surface 10a of the disk 10 which is brought into contact with a head 20 is also the surface of the protection film 14. The texture of the surface 10a is formed by copying the surface shape of the underlayer film 12 which is formed in the step shown in FIG. 5B.

[Experiment 1]

A plurality of sample disks S1 to S13 having the structure shown in FIG. 3B were manufactured according to the manufacturing method shown in FIGS. 4A to 4D while different abrasion conditions were used in the abrasion step shown in FIG. 4B. Then, the surface of each of the disks S1 to S13, i.e., the surface of the protection film 14, was measured by a conventional surface shape measuring apparatus (AFM: atomic force microscope), and factorized into frequency compositions by means of Fourier transform, so as to examine the relationship between the wave length Le and the amplitude Am of the wavy pattern of the surface texture. Further, each of the disks S1 to S13 was combined with a contact head and subjected to a contact running test and an r/w (read/write) test. In the tests, the contact width CW between the head 20 and the disk in the track width direction was set at 30 μm.

Figure 6:
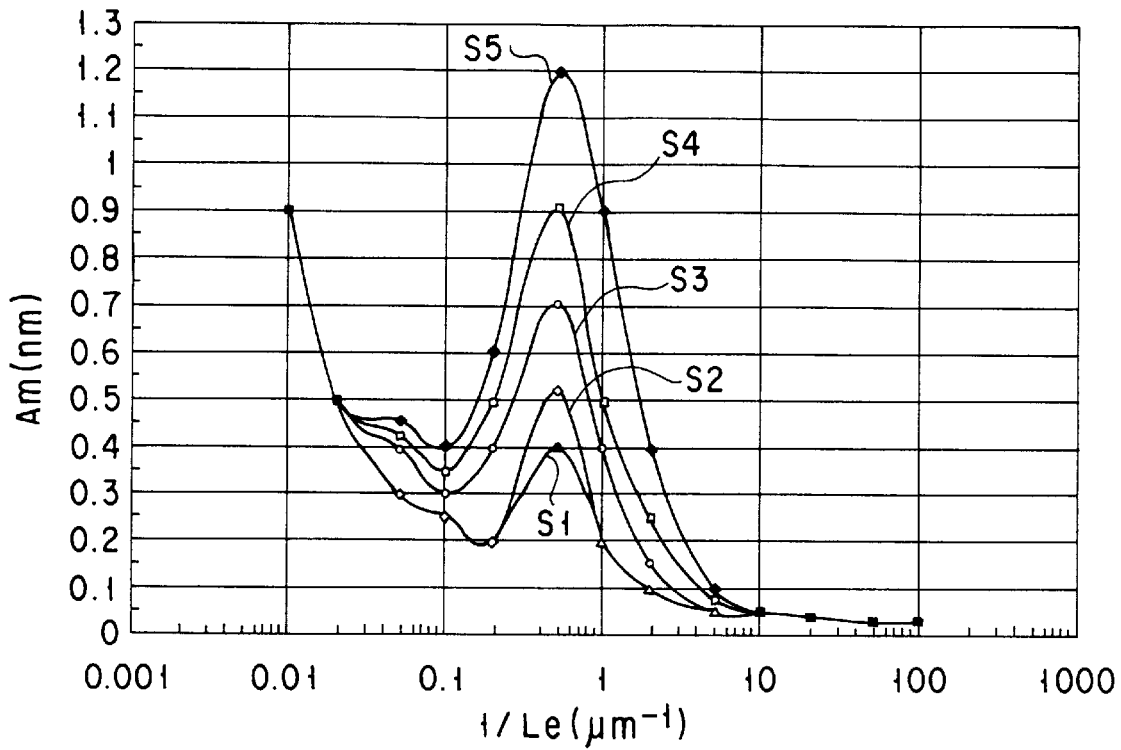
FIG. 6 is a graph showing relationships between the wave length and amplitude of a wavy pattern constituting a surface texture on a disk, obtained in an experiment 1.

FIG. 6 is a graph showing relationships between the wave length Le and the amplitude Am of the wavy pattern of the surface texture in the sample disks S1 to S5. The disks S1 to S5 were treated with different periods of abrasion time in the abrasion step shown in FIG. 4B. As shown in FIG. 6, each of the disks S1 to S5 had a peak value of the amplitude at a wave length of about 2 μm. It was confirmed that the peak amplitude values varied with a change in periods of abrasion time in the abrasion step shown in FIG. 4B.

Further, each of the disks S1 to S5 was subjected to the contact running test and the r/w test where the contact width CW was set at 30 μm, and the linear recording density of the disk at 150 kFCI. As a result, it was confirmed that running of the head was smooth and frictional force and fluctuation in output signals among track portions were small for the disks S2, S3, S4, and S5 which had a peak amplitude value of 0.5 nm or more. The disk S5, however, presented an output fluctuation slightly larger than the disk S2, S3, and S4.

As described above, it has been found that the contact running of the disk and head is smooth and frictional force is small, where the peak amplitude value of the surface texture of the disk is set to be 0.5 nm or more. It is thought that the contact running becomes smooth due to a decrease in the sticking force between the head and disk in contact.

On the other hand, it was confirmed that where the peak amplitude value H of the surface texture was too large, spacing between the disk and head varied, thereby causing fluctuation in the output signal level of the head. For this reason, it is thought that fluctuation in output signals among track portions can be suppressed where the peak amplitude value H is set to be equal to or less than the recording bit length BL, and preferably equal to or less than 5 nm. More preferably, the peak amplitude value H is set to be equal to or less than 1 nm in consideration of the experimental result of the disk S5.

Figure 7:
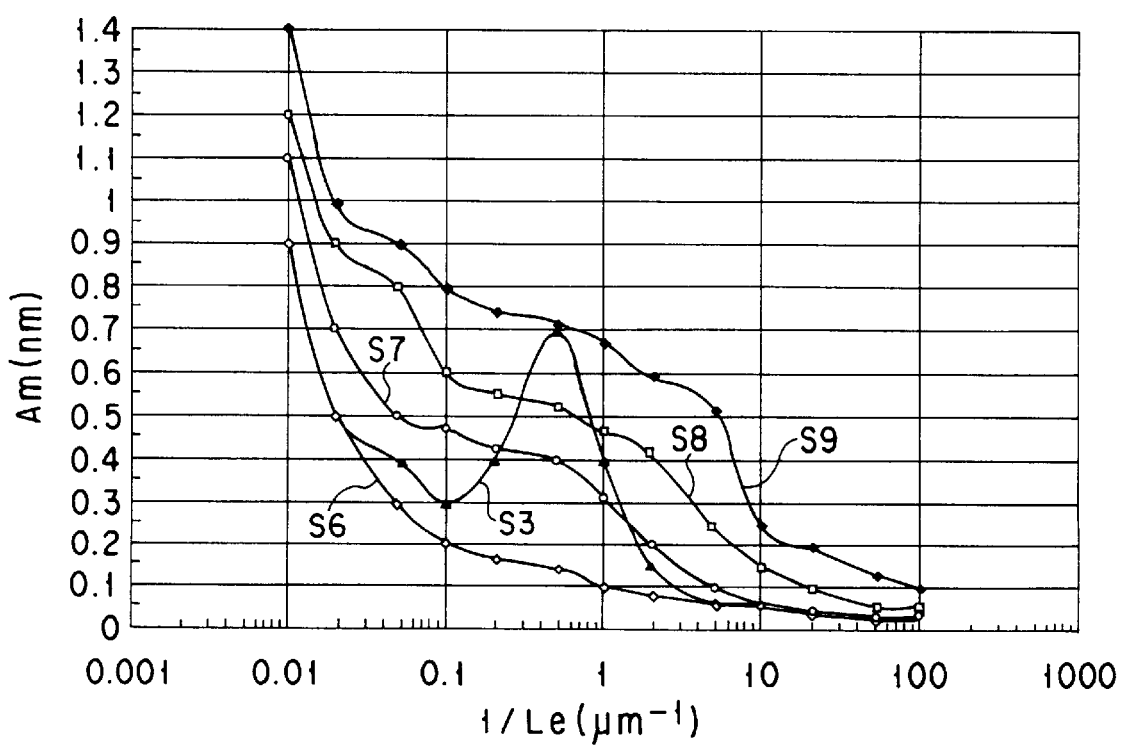
FIG. 7 is a graph showing other relationships between the wave length and amplitude of a wavy pattern constituting a surface texture on a disk, obtained in the experiment 1.

FIG. 7 is a graph showing relationships between the wave length Le and the amplitude Am of the wavy pattern of the surface texture in the sample disks S3, and S6 to S9. The disk S3 was treated with abrasive grains having a uniform diameter while the disks S6 to S9 were treated with abrasive grains having distributed diameters, in the abrasion step shown in FIG. 4B. As shown in FIG. 7, the disk S3 had a peak value of the amplitude at a wave length of about 2 μm, while the disks S6 to S9 had no peak value of the amplitude. The amplitude of the disks S6 to S9 generally became larger with an increase in the period of abrasion time.

Further, each of the disks S3, and S6 to S9 was subjected to the contact running test and the r/w test where the contact width CW was set at 30 μm, the track pitch at 2.0 μm, and the linear recording density of the disk at 150 kFCI. As a result, it was confirmed that running of the head was smooth and frictional force and fluctuation in output signals among track portions were small for the disks S3, and S7 to S9 which had an amplitude value of 0.5 nm or more at a wave length of 30 μm ( corresponding to the contact width CW between the disk and head) or less. However, when the disk S3 having peak amplitude value was compared with the disks S6 to S9, it was confirmed that the disks S6 to S9 presented larger medium noises.

As described above, it has been found that where abrasive grains having a uniform diameter are used in the abrasion step of forming an up-and-down wavy pattern which can be the origin of the surface texture, a peak value of the amplitude appears. In addition, it has been found that the contact width CW should be larger than the wave length WL for providing the peak amplitude value H.

FIG. 8 is a graph showing relationships between the wave length Le and the amplitude Am of the wavy pattern of the surface texture in the sample disks S10 to S13. The disks S10 to S13 were treated with abrasive grains having diameters different from each other, though a uniform diameter of abrasive grains was used for each disk. The diameters of abrasive grains used for abrading the disks S10 to S13 were 5 μm, 2.7 μm, 1.7 μm, and 0.5 μm, respectively. As shown in FIG. 8, each of the disk S10 to S13 had a peak value of the amplitude, and the wave length for providing the peak value varied in accordance with the diameters of the abrasive grains in the abrasion step.

Further, each of the disks S10 to S13 was subjected to the contact running test and the r/w test in a case where the contact width CW was set at 30 μm, the track pitch at 1.3 μm, and the linear recording density of the disk at 60 kFCI and in another case where the contact width CW was set at 30 μm, the track pitch at 2.0 μm, and the linear recording density of the disk at 150 kFCI. As a result, it was confirmed that although running of the head was smooth for all the disks S10 to S13, abrasion amount was increased with a decrease in the wave length for providing the peak value of the amplitude.

In the test using the recording density of 60 kFCI, medium noises generated by the disk S10, which had a wave length of 5 μm for providing the peak amplitude value, had a wave length ten times the recording density (recording bit length BL) or more, so that their influence on the error rate was small. In contrast, medium noises generated by the other disks S11 to S13 had a frequency close to the recording density, thereby increasing the error rate.

In the test using the recording density of 150 kFCI, medium noises generated by the disks S10 and S11, which had a wave length of 2 μm or more for providing the peak amplitude value, had a wave length five times the recording density (recording bit length BL) or more, so that their influence on the error rate was small. In contrast, medium noises generated by the other disks S12 and S13 had a frequency close to the recording density, thereby increasing the error rate.

As described above, it has been found that, in the abrasion step of forming an up-and-down wavy pattern which can be the origin of the surface texture, where abrasive grains having a uniform diameter are used, a peak value of the amplitude appears, and where the diameter is changed, the wave length for providing the peak value varies. In addition, it has been found that where the wave length WL for providing the peak amplitude value H is set to be ten times the recording bit length BL or more, influence of medium noises on the error rate can be small. It is thought that this is because the medium noises are generated in a wave length ten times the recording density or more, so that the noises are generated in a low frequency domain and separated from a recording frequency domain.

[Experiment 2]

A plurality of sample disks S14 to S23 having the structure shown in FIG. 3A were manufactured according to the manufacturing method shown in FIGS. 5A to 5D while the disks were provided with an underlayer film of vanadium (V) different from each other in the thickness. The thicknesses of the underlayer film 12 of the disks S14 to S23 were 5 nm, 10 nm, 20 nm, 30 nm, 45 nm, 60 nm, 100 nm, 120 nm, 240 nm, and 360 nm, respectively.

In the experiment 2, first, the surface of a substrate 11 of each of the disks S14 to S23 was measured by a conventional surface shape measuring apparatus (AFM: atomic force microscope), and factorized into frequency compositions by means of Fourier transform, so as to evaluate it. Then, the surface of each of the disks S14 to S23, i.e., the surface of the protection film 14, was measured by the AFM, and factorized into frequency compositions by means of Fourier transform, so as to detect the peak amplitude value H and the wave length WL for providing the peak amplitude value H in the wavy pattern of the surface texture.

Further, each of the disks S14 to S23 was combined with a contact head and subjected to a contact running test and an r/w (read/write) test. In the tests, the contact width CW between the head 20 and the disk was set at 30 μm, the speed of revolution at 5,000 rpm, and the linear recording density of the disk at 250 kFCI. Each contact running test was continued under the same conditions for a week. After the contact running test, the surface of each of the disks S14 to S23, i.e., the surface of the protection film 14, was measured by the AFM, and factorized into frequency compositions by means of Fourier transform, so as to evaluate it.

Table 1 shows results of the experiment 2, in which "S" stands for a sample disk number; "FT" for an underlayer film thickness; "H" for a peak amplitude value; "WL" for a wave length for providing a peak amplitude value; "AB" for sticking property; "FW" for abrasion property; and "N" for noise property. Further, "O", "X" and "Δ" mean a good property, a bad property, and a property between the good and bad properties, respectively.

TABLE 1

| S  | FT (nm) | H (nm) | WL (μm) | AB | FW | N |
|----|---------|--------|---------|----|----|----|
| 14 | 5       | 0.28   | 1.36    | X  | O  | O |
| 15 | 10      | 0.32   | 1.26    | X  | O  | O |
| 16 | 20      | 0.43   | 1.27    | X  | O  | O |
| 17 | 30      | 0.51   | 1.28    | O  | O  | O |
| 18 | 45      | 0.53   | 1.28    | O  | O  | O |
| 19 | 60      | 0.56   | 1.30    | O  | O  | O |
| 20 | 100     | 0.61   | 1.32    | O  | O  | O |
| 21 | 120     | 0.72   | 0.175   | O  | O  | X |
| 22 | 240     | 0.90   | 0.27    | O  | O  | X |
| 23 | 360     | 1.61   | 0.417   | O  | Δ  | X |

For all the disks S14 to S23, a clear peak amplitude value H was observed on the surface of the protection film 14, as shown in Table 1, though no clear peak value of the amplitude was observed on the surface of the Si substrate 11. This is because a surface shape having an up-and-down wavy pattern, which is the origin of the surface texture, was formed over the entire surface of the underlayer film 12 when the vanadium film was formed on the substrate 11 by sputtering. Note that the wavy patter of the surface texture in all the disks S14 to S23 was almost uniform in the plane, and there was no unisotropy depending on directions in the plane.

As shown in Table 1, the peak amplitude value H was increased with an increase in the thickness of the underlayer film 12. The wave length WL for providing the peak amplitude value H was about 1.3 μm in the disks S14 to S20 in which the underlayer film 12 had a thickness of 100 nm or less, while the wave length WL was less than 1.0 μm in the disks S21 to S 23 in which the underlayer film 12 had a thickness of more than 100 nm.

As shown in the column "AB" of Table 1, a sticking phenomenon of the head was caused in the disks S14 to S16 in which the peak amplitude value H was less than 0.5 nm, while no sticking phenomenon of the head was caused in the disks S17 to S 23 in which the peak amplitude value H was more than 0.5 nm. As shown in the column "FW" of Table 1, the disks S14 to S20, in which the peak amplitude value H was 1.0 nm or less, generated essentially no abrasion powder, as a result of evaluating their surface after the contact running test. Further, as shown in the column "IN" of Table 1, the disks S14 to S20, in which the wave length WL was more than ten times a recording bit length of 0.1016 μm, generated less noises due to a surface roughness, while the disks S21 to S23, in which the wave length WL was less than ten times a recording bit length of 0.1016 μm, generated some noises due to a surface roughness.

As described above, according to the embodiment explained with reference to FIGS. 1 to 8 and Table 1, a sticking phenomenon of the head and disk is suppressed so as to realize a smooth running for a long period of time, and abrasion and medium noises due to the surface texture of the disk are also suppressed, by specifying the shape of the surface texture. Accordingly, where the embodiment is applied to a hard disk drive of the contact type, it is possible to realize a high recording density and a reliable data recording and reproducing.

Now, another embodiment of the present invention will be explained. The characteristics of this embodiment can be utilized either along with or without the above described characteristics of the surface texture of a disk.

This embodiment is characterized in that the peak of a shearing stress SS caused by a load, which is given to a magnetic disk 10 by a magnetic head 20, i.e., a head load, is positioned in a substrate 11, as shown in FIG. 9A. In order to position the peak of the shearing stress SS in the substrate, a relationship between the head load and the total thickness of magnetic and protection films 13 and 14 is specified. More precisely, the following expression is satisfied where the head load P (mgf), the thickness tm (nm) of the magnetic film 13, and the thickness tp (nm) of the protection film 14 are used:

$$tm+tp \leq 35-P/5$$

With this relationship, it is possible to prevent damages, such as separation, of the magnetic and protection films 13 and 14, and to increase durability of the disk 10. These can be explained as follows.

Where the magnetic head 20 is brought into contact with the disk 10 with a head load, a shearing stress is generated in each of the head 20 and disk 10, and especially the disk 10 suffers damages due to the stress. Generally, where the head load is constant, the disk 10 suffers damages more easily with a decrease in the thickness of the protection film 14. For this reason, conventionally, it has been considered that the thickness of the protection film can hardly be reduced in consideration of durability of the disk. On the other hand, the protection film 14 should be thin in order to decrease the effective spacing between the head 20 and the protection film 13 in consideration of the recording and reproducing properties. Accordingly, a protection film material, which can suppress damages of a disk even if it is thin, is required, though such a material has not yet been realized.

The present inventors have found that where the total thickness tm+tp of the magnetic and protection films 13 and 14 is small, durability of the disk 10 is increased in some cases, from experiments in which the thickness tm of the magnetic film 13, the thickness tp of the protection film 14, and the head load P were changed among various values. Further, it has been found that values of the total thickness tm+tp for improving durability of the disk 10 do not greatly depend on the head load P. It is thought that this is the reason, as will be described with reference to FIGS. 9A and 9B.

When the head 20 is running while being in contact with the disk 10, a shearing stress applied to the disk 10 from the head 20 varies in the depth direction from the disk surface and presents a peak value at a position having a certain depth from the disk surface. On the other hand, damages given to the disk 10 by the head 20 are thought to be caused mainly as separation of a thin film, such as the magnetic film 13, formed on the substrate 11, from the substrate 11 at their interface. In other words, if the separation of the thin film is caused by the shearing stress at the interface between the substrate 11 and the thin film formed thereon, the reason of the separation can be assumed such that the shearing stress at the interface is larger than the adhering force between the substrate 11 and the thin film.

In consideration of this, where the peak of the shearing stress SS is positioned in the substrate as shown in FIG. 9A, or the peak of the shearing stress SS is positioned in the thin film as shown in FIG. 9B, it is possible to make the shearing stress at the interface smaller. Note that, however, it is not desirable to position the peak of the shearing stress in the thin film, since quality of the thin film is degraded. Therefore, in the present invention, it is preferable to position the peak of the shearing stress SS in the substrate so as to absorb the shearing stress in the substrate.

This concept is the same in a case where an underlayer film 12 is arranged between a substrate 11 and a magnetic film 13 as shown in FIG. 1. In this case, the underlayer film 12 is considered to be a part of the substrate 11, and the above described interface corresponds to the interface between the magnetic film 13 and the underlayer film 12.

In the present invention, as described above, a relationship between the head load P and the thickness of a thin film formed on the substrate 11, such as the total thickness of the magnetic and protection films 13 and 14, is optimized. By doing so, the peak of the shearing stress is positioned in the substrate 11, so as to prevent separation of the film and improve durability of the disk.

[Experiment 3]

A plurality of sample disks 10 of the hard disk type formed of a substrate 11, a magnetic film 13, and a protection film 14, with no underlayer film 12, were manufactured, such that they differed from each other in the thickness of the protection film 14. In a process of manufacturing the disks, a glass substrate having a diameter of 2.5 inches was used as the substrate 11, on which the magnetic film 13 of a Co alloy magnetic film and the protection film 14 of a carbon thin film were formed in this order, in a DC magnetron sputtering apparatus, using a Co alloy target and a carbon target, respectively. The magnetic film 13 had a constant thickness of 5 nm, while the protection film 14 had different thicknesses of 5 nm, 10 nm, 15 nm, 20 nm, 25 nm, 30 nm, and 35 nm, respectively.

Each of the sample disks 10 was coated with a lubricant, and subjected to a slide durability test, using a magnetic head 20 of the contact type, as shown in FIG. 1. The head 20 had an effective contact surface in an order of a several tens µm square to several hundreds µm square.

Figure 10:
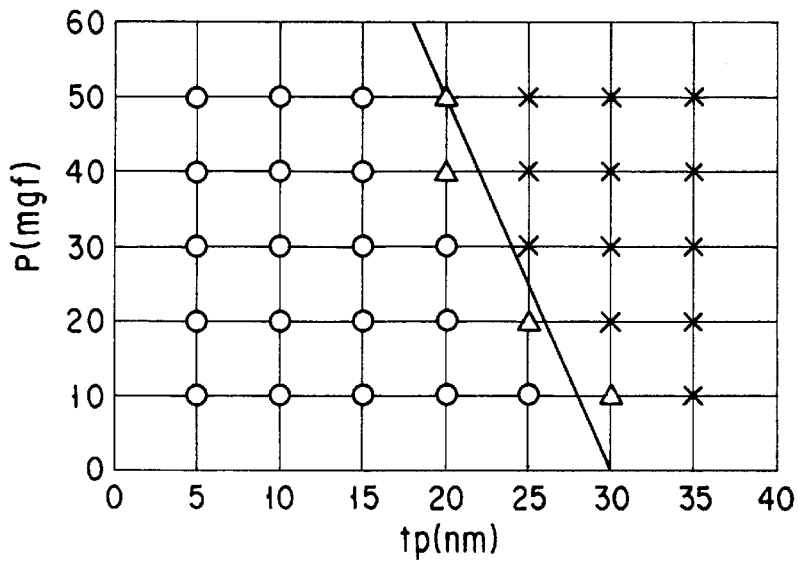
FIG. 10 is a graph showing the result of a disk durability test obtained in an experiment 3, with the axis of abscissas denoting the thickness of a protection film and the axis of ordinates denoting a head load.
Figure 11:
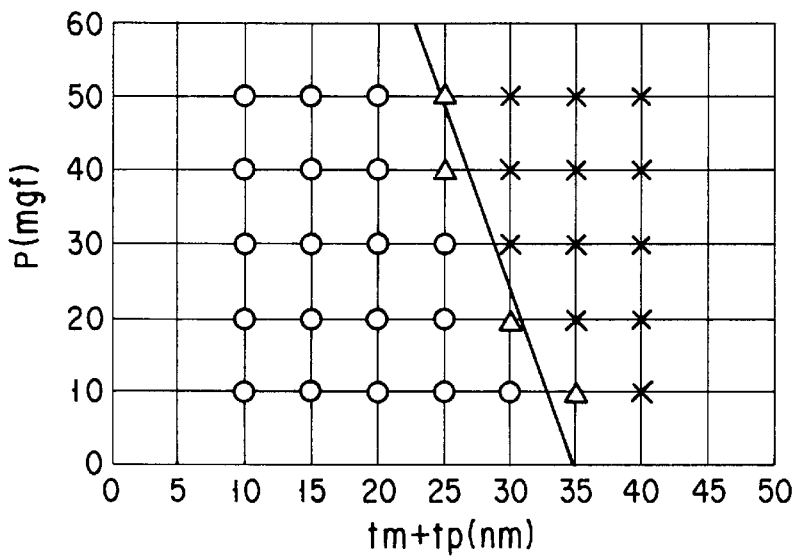
FIG. 11 is a graph showing the result of the disk durability test obtained in the experiment 3, with the axis of abscissas denoting the total thickness of magnetic and protection films and the axis of ordinates denoting a head load.

Different loads were given to the sample disks 10, by applying different loads to the magnetic head 20. FIGS. 10 and 11 show the result of this experiment. The durability test was conducted, using the same track, and the tested sample disks were evaluated on the basis of criteria shown in Table 2.

TABLE 2

| Damage Level | Evaluation |
|---|---|
| No damage | "○" |
| Film separation in part | "Δ" |
| Film separation all over | "X" |

FIG. 10 is a graph showing the result, with the axis of abscissas denoting the thickness tp of the protection film 14 and the axis of ordinates denoting the head load P. FIG. 11 is a graph showing the result, with the axis of abscissas denoting the total thickness tm+tp of magnetic and protection films 13 and 14 and the axis of ordinates denoting the head load P. The bold lines shown in FIGS. 10 and 11 show border line conditions with which essentially no damage is caused even if a film separation is partly caused as the case may be, on the basis of the criteria shown in Table 2. From this result, it has been found that an excellent durability can be attained by setting a relationship between tm+tp and P to satisfy the following expression:

$$tm+tp \leq 35-P/5$$

[Experiment 4]

A plurality of sample disks 10 of the hard disk type formed of a substrate 11, a magnetic film 13, and a protection film 14, with no underlayer film 12, were manufactured, such that they differed from each other in the thickness of the protection film 14. In a process of manufacturing the disks, a glass substrate having a diameter of 2.5 inches was used as the substrate 11, on which the magnetic film 13 of a Co alloy magnetic film and the protection film 14 of a carbon thin film were formed in this order, in a DC magnetron sputtering apparatus, using a Co alloy target and a carbon target, respectively. The magnetic film 13 had a constant thickness of 25 nm, while the protection film 14 had different thicknesses of 5 nm, 10 nm, 15 nm, 20 nm, and 25 nm, respectively.

Each of the sample disks 10 was coated with a lubricant, and subjected to a slide durability test, using a magnetic head 20 of the contact type, as shown in FIG. 1. The head 20 had an effective contact surface in an order of a several tens μm square to several hundreds μm square.

Figure 12:
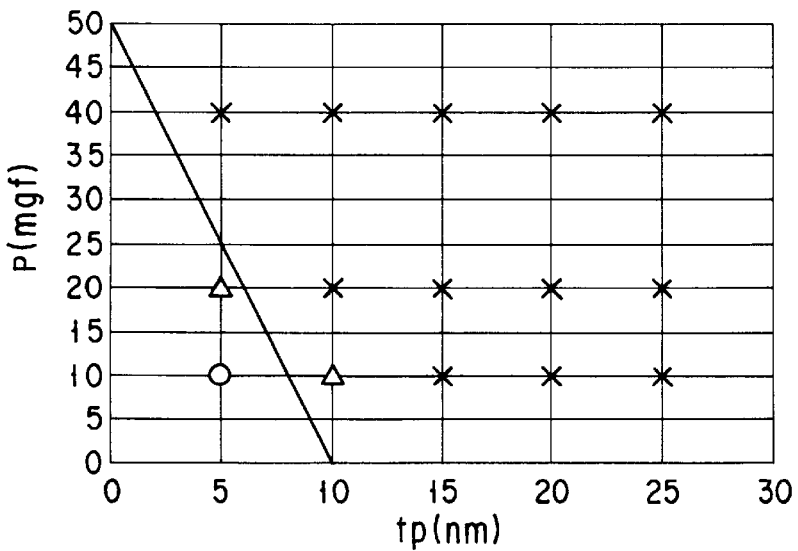
FIG. 12 is a graph showing the result of a disk durability test obtained in an experiment 4, with the axis of abscissas denoting the thickness of a protection film and the axis of ordinates denoting a head load.
Figure 13:
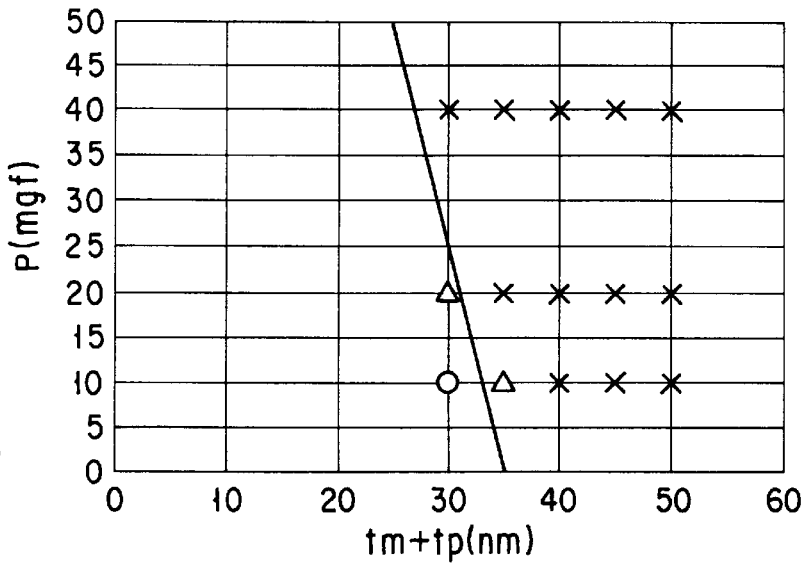
FIG. 13 is a graph showing the result of the disk durability test obtained in the experiment 4, with the axis of abscissas denoting the total thickness of magnetic and protection films and the axis of ordinates denoting a head load.

Different loads were given to the sample disks 10, by applying different loads to the magnetic head 20. FIGS. 12 and 13 show the result of this experiment. The durability test was conducted, using the same track, and the tested sample disks were evaluated on the basis of criteria shown in Table 2.

FIG. 12 is a graph showing the result, with the axis of abscissas denoting the thickness tp of the protection film 14 and the axis of ordinates denoting the head load P. FIG. 13 is a graph showing the result, with the axis of abscissas denoting the total thickness tm+tp of magnetic and protection films 13 and 14 and the axis of ordinates denoting the head load P. The bold lines shown in FIGS. 12 and 13 show border line conditions with which essentially no damage is caused even if a film separation is partly caused as the case may be, on the basis of the criteria shown in Table 2. From this result, it has been found that an excellent durability can be attained by setting a relationship between tm+tp and P to satisfy the following expression:

$$tm+tp \leq 35-P/5$$

[Experiment 5]

A plurality of sample disks 10 of the hard disk type formed of a substrate 11, a magnetic film 13, and a protection film 14, with no underlayer film 12, were manufactured, such that they differed from each other in the thickness of the protection film 14. In a process of manufacturing the disks, a glass substrate having a diameter of 2.5 inches was used as the substrate 11, on which the magnetic film 13 of a Co alloy magnetic film and the protection film 14 of a silicon thin film were formed in this order, in a DC magnetron sputtering apparatus, using a Co alloy target and a silicon target, respectively. The magnetic film 13 had a constant thickness of 5 nm, while the protection film 14 had different thicknesses of 5 nm, 10 nm, 15 nm, 20 nm, 25 nm, 30 nm, and 35 nm, respectively.

Each of the sample disks 10 was coated with a lubricant, and subjected to a slide durability test, using a magnetic head 20 of the contact type, as shown in FIG. 1. The head 20 had an effective contact surface in a order of an several tens μm square to several hundreds μm square.

Figure 14:
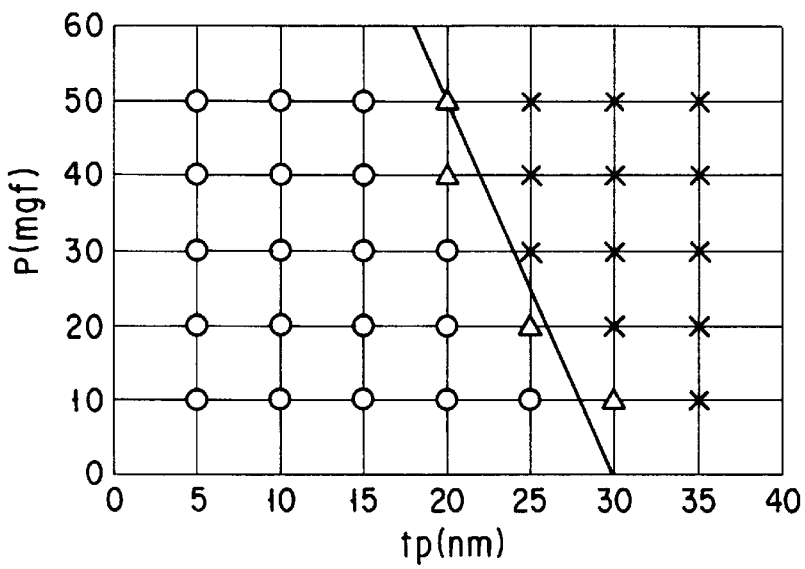
FIG. 14 is a graph showing the result of a disk durability test obtained in an experiment 5, with the axis of abscissas denoting the thickness of a protection film and the axis of ordinates denoting a head load.
Figure 15:
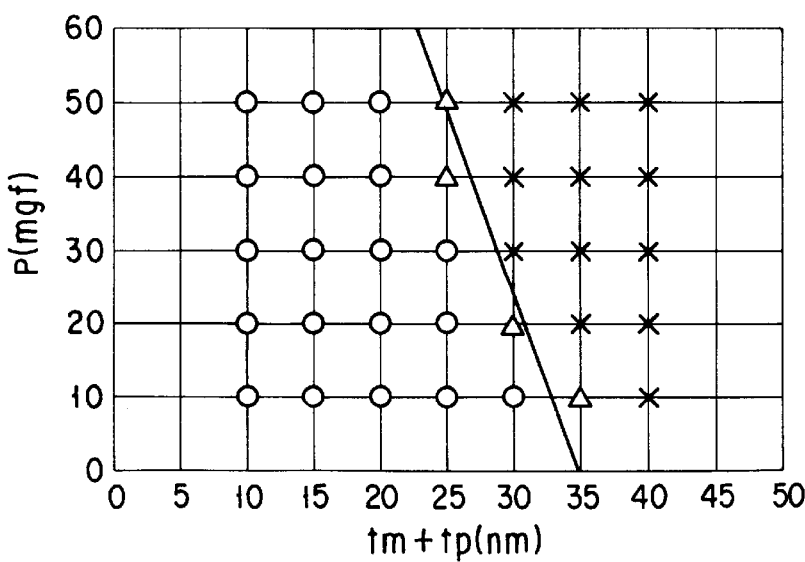
FIG. 15 is a graph showing the result of the disk durability test obtained in the experiment 5, with the axis of abscissas denoting the total thickness of magnetic and protection films and the axis of ordinates denoting a head load.

Different loads were given to the sample disks 10, by applying different loads to the magnetic head 20. FIGS. 14 and 15 show the result of this experiment. The durability test was conducted, using the same track, and the tested sample disks were evaluated on the basis of criteria shown in Table 2.

FIG. 14 is a graph showing the result, with the axis of abscissas denoting the thickness tp of the protection film 14 and the axis of ordinates denoting the head load P. FIG. 15 is a graph showing the result, with the axis of abscissas denoting the total thickness tm+tp of magnetic and protection films 13 and 14 and the axis of ordinates denoting the head load P. The bold lines shown in FIGS. 14 and 15 show border line conditions with which essentially no damage is caused even if a film separation is partly caused as the case may be, on the basis of the criteria shown in Table 2. From this result, it has been found that an excellent durability can be attained by setting a relationship between tm+tp and P to satisfy the following expression:

$$tm+tp \leq 35-P/5$$

[Experiment 6]

A plurality of sample disks 10 of the hard disk type formed of a substrate 11, an underlayer film 12, a magnetic film 13, and a protection film 14, were manufactured, such that they differed from each other in the thickness of the protection film 14. In a process of manufacturing the disks, a glass substrate having a diameter of 2.5 inches was used as the substrate 11, on which the underlayer film 12 of a Cr thin film, the magnetic film 13 of a Co alloy magnetic film, and the protection film 14 of a DLC carbon thin film were formed in this order, in a DC magnetron sputtering apparatus, using a Cr target, a Co alloy target, and a carbon target, respectively. The underlayer film 12 and the magnetic film 13 had constant thicknesses of 30 nm and 25 nm, respectively, while the protection film 14 had different thicknesses of 5 nm, 10 nm, 15 nm, 20 nm, and 25 nm, respectively.

Each of the sample disks 10 was coated with a lubricant, and subjected to a slide durability test, using a magnetic head 20 of the contact type, as shown in FIG. 1. The head 20 had an effective contact surface in an order of a several tens μm square to several hundreds μm square.

Figure 16:
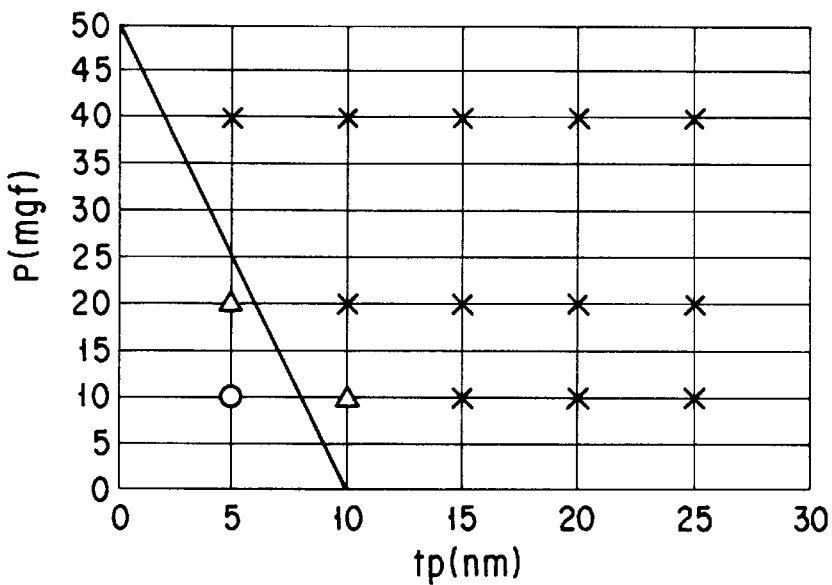
FIG. 16 is a graph showing the result of a disk durability test obtained in an experiment 6, with the axis of abscissas denoting the thickness of a protection film and the axis of ordinates denoting a head load.
Figure 17:
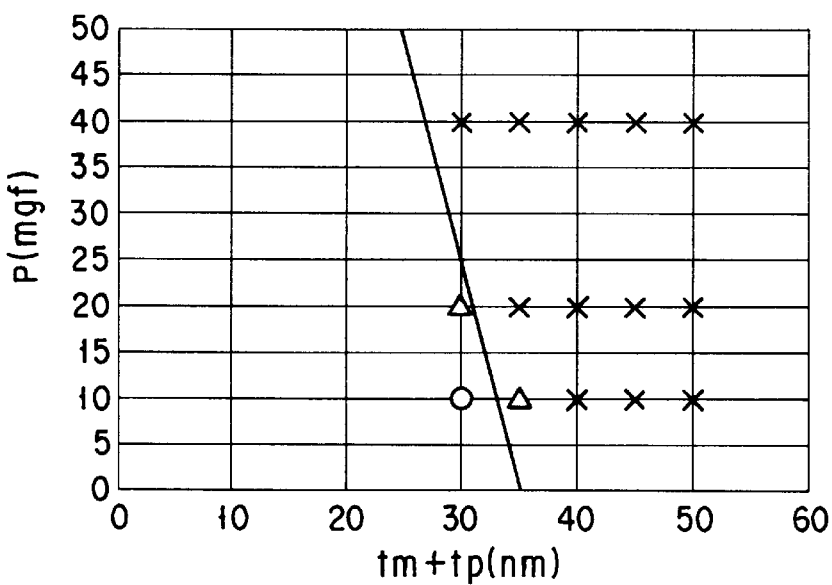
FIG. 17 is a graph showing the result of the disk durability test obtained in the experiment 6, with the axis of abscissas denoting the total thickness of magnetic and protection films and the axis of ordinates denoting a head load.
Figure 18A:
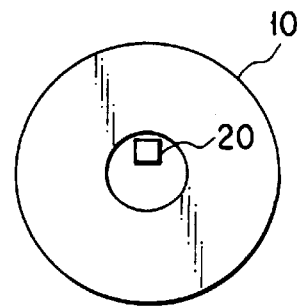
FIGS. 18A and 18B are views showing a conventional relationship between a disk and a head.
Figure 18B:
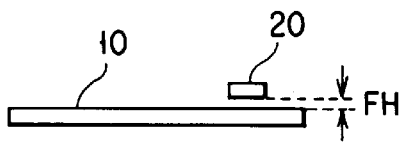

Different loads were given to the sample disks 10, by applying different loads to the magnetic head 20. FIGS. 16 and 17 show the result of this experiment. The durability test was conducted, using the same track, and the tested sample disks were evaluated on the basis of criteria shown in Table 2.

FIG. 16 is a graph showing the result, with the axis of abscissas denoting the thickness tp of the protection film 14 and the axis of ordinates denoting the head load P. FIG. 17 is a graph showing the result, with the axis of abscissas denoting the total thickness tm+tp of magnetic and protection films 13 and 14 and the axis of ordinates denoting the head load P. The bold lines shown in FIGS. 16 and 17 show border line conditions with which essentially no damage is caused even if a film separation is partly caused as the case may be, on the basis of the criteria shown in Table 2. From this result, it has been found that an excellent durability can be attained by setting a relationship between tm+tp and P to satisfy the following expression:

$$tm+tp \leq 35-P/5$$

Further, disks which suffered a film separation and thus were damaged in accordance with FIGS. 16 and 17, were observed in detail, whereby a separation was recognized between the underlayer film 12 and the magnetic film 13. It was thought that the separation between the under layer film 12 and the magnetic film 13 occurred as an initial cause, and then the film separation and breakage over the entirety of the disk proceeded therefrom. Note that this phenomenon was not observed in the sample disks having no underlayer film 12 in the experiments 3 to 5.

As described above, according to the embodiment explained with reference to FIGS. 9 to 17 and Table 2, the peak of a shearing stress SS caused by a head load, which is given to a magnetic disk by a magnetic head, is positioned in a substrate (including an underlayer film, if necessary), by specifying a relationship between the head load and the total thickness of magnetic and protection films. With this relationship, it is possible to prevent separation of the magnetic and protection films of the disk, and to increase durability of the disk.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

We claim:

1. A hard disk drive comprising:
   a magnetic disk used as a magnetic recording medium; and
   a magnetic head for applying a magnetic field to the disk so as to perform recording and for detecting a magnetic field from the disk so as to perform reproducing;
   wherein during the recording and reproducing, the head is moved relative to the disk so as to define a track, said track comprising a series of a number of recording bits on the disk,
   wherein the head is brought into contact with the disk at least during the recording and reproducing, with a head contact width in a width direction of the disk,
   wherein the disk has a surface texture which presents a substantially single peak amplitude value when the surface texture is factorized into frequency compositions by means of Fourier transform, and
   wherein a wave length for providing the peak amplitude value is ten times a recording bit length of each recording bit or more and equal to or less than the head contact width, said head contact width being two or more times larger than the wave length and said peak amplitude value is in a range of 0.5–5.0 nm.

2. The hard disk drive according to claim 1, wherein the disk comprises a supporting plate and a magnetic film arranged on the supporting plate, and the surface texture has a shape copying a surface shape of the supporting plate.

3. The hard disk drive according to claim 2, wherein the surface shape of the supporting plate is formed by abrasion.

4. The hard disk drive according to claim 2, wherein the supporting plate comprises a substrate and an underlayer film of vanadium or vanadium alloy arranged on the substrate, and the surface shape of the supporting plate is formed when the underlayer film is formed.

5. The hard disk drive according to claim 1, wherein the disk comprises a supporting plate and a magnetic film arranged on the supporting plate, and a peak of shearing stress caused by a load given to the disk by the head in contact with the disk is positioned in the supporting plate.

6. The hard disk drive according to claim 5, wherein the disk further comprises a protection film arranged on the magnetic film, and a relationship between the load and a total thickness of the magnetic and protection films is set such that the peak of the shearing stress is positioned in the supporting plate.

7. The hard disk drive according to claim 6, the following expression is satisfied where P (mgf) stands for the load, tm (nm) for a thickness of the magnetic film, and tp (nm) for a thickness of the protection film:

$$tm+tp \leq 35-P/5.$$

8. A hard disk drive comprising:
   a magnetic disk used as a magnetic recording medium; and
   a magnetic head for applying a magnetic field to the disk so as to perform recording and for detecting a magnetic field from the disk so as to perform reproducing;
   wherein during the recording and reproducing, the head is moved relative to the disk so as to defined a track, said track comprising a series of a number of recording bits on the disk,
   wherein the head is brought into contact with the disk at least during the recording and reproducing, with a head contact width in a width direction of the disk,
   wherein the disk has a surface texture which presents a peak amplitude value falling in a range of 0.5–5.0 nm when the surface texture is factorized into frequency compositions by means of Fourier transform, and
   wherein a wave length for providing the peak amplitude value is ten times a maximum recording bit length or more, and equal to or less than the head contact width, said head contact width being two or more times larger than the wave length.

9. The hard disk drive according to claim 8, wherein the disk comprises a supporting plate and a magnetic film arranged on the supporting plate, and the surface texture has a shape copying a surface shape of the supporting plate.

10. The hard disk drive according to claim 9, wherein the surface shape of the supporting plate is formed by abrasion.

11. The hard disk drive according to claim 9, wherein the supporting plate comprises a substrate and an underlayer film of vanadium or vanadium alloy arranged on the substrate, and the surface shape of the supporting plate is formed when the underlayer film is formed.

12. The hard disk drive according to claim 8, wherein the disk comprises a supporting plate and a magnetic film arranged on the supporting plate, and a peak of shearing stress caused by a load given to the disk by the head in contact with the disk is positioned in the supporting plate.

13. The hard disk drive according to claim 12, wherein the disk further comprises a protection film arranged on the magnetic film, and a relationship between the load and a total thickness of the magnetic and protection films is set such that the peak of the shearing stress is positioned in the supporting plate.

14. The hard disk drive according to claim 13, the following expression is satisfied where P (mgf) stands for the load, tm (nm) for a thickness of the magnetic film, and tp (nm) for a thickness of the protection film:

$$tm+tp \leq 35-P/5.$$

* * * * *